United States Patent [19]

Mills

[11] 3,877,476

[45] Apr. 15, 1975

[54] HEAT ACTUATED VALVE

[75] Inventor: Kenneth N. Mills, Tulsa, Okla.

[73] Assignee: Kenco Engineering Company, Tulsa, Okla.

[22] Filed: Aug. 22, 1973

[21] Appl. No.: 390,604

[52] U.S. Cl. .................................. 137/75; 251/326
[51] Int. Cl. ............................................. F16k 17/40
[58] Field of Search .............................. 137/72–77; 220/89 B; 122/504.1, 504.3

[56] References Cited
UNITED STATES PATENTS

| | | | |
|---|---|---|---|
| 1,834,645 | 12/1931 | Ryan | 137/76 |
| 2,946,485 | 7/1960 | Durner | 251/324 X |

FOREIGN PATENTS OR APPLICATIONS

| | | | |
|---|---|---|---|
| 56,580 | 8/1939 | Denmark | 137/74 |
| 496,226 | 9/1953 | Canada | 137/75 |

*Primary Examiner*—Martin P. Schwadron
*Assistant Examiner*—Richard Gerard

[57] ABSTRACT

A heat actuated valve interposed in a flow line or the like for automatically closing the flow line when excessive temperaure conditions occur, and comprising a housing having a movable closure member therein secured to the flow line and in communication with the interior thereof, sleeve means constructed from heat responsive or eutectic material cooperating with the closure member for retaining the closure member in a normally open position, spring means engagable with the closure member for constantly urging the closure member toward a closed position, means encasing the heat responsive sleeve for precluding flow of the heat responsive material at undesirably low temperatures for precluding accidental closing of the valve, said encasing means being provided with means permitting flow of the heat responsive material when the ambient temperature reaches a predetermined high level whereby said spring means automatically moves the closure member to a closed position for precluding flow of fluid through the line, and bleed port means provided below the closed position of the closure member for assuring a complete and efficient closing of the closure member.

5 Claims, 3 Drawing Figures

HEAT ACTUATED VALVE

BACKGROUND OF THE INVENTION

1. Field of the Invention

This invention relates to improvements in heat actuated valves and more particularly, but not by way of limitation, to a heat actuated valve particularly designed and constructed for precluding accidental closing or partial of the valve at lower temperatures than those which actually require the closing of the valve.

2. Description of the Prior Art.

There are many instances wherein it is desirable to quickly and efficiently stop the flow of fluid through a flow line in the event the surrounding or ambient temperature reaches a predetermined high level, such as might be created by a fire, or the like. For example, flow lines carrying highly volatile fluids, such as natural gas, or the like, may create great hazards if the fluid is permitted to flow into a high temperature area such as those generated by a fire. Safety valves of many types have been developed for automatically shutting down a flow line under these conditions. One type of safety valve includes the use of a heat responsive or eutectic material, which melts at a relatively low temperature. When an excessive temperature is detected, the eutectic material flows and releases a closure member which closes or seals off the flow line for interrupting the flow of fluid therethrough. These valves have certain disadvantages, however, in that the eutectic materials frequently "cold flow" at a relatively low temperature, or at least "balloon" or otherwise become distorted and permit a premature closing or partial closing of the valve at a lower temperature than that requiring the emergency closing of the flow line. In addition, many of the valves utilize gate-type closure members which move transversely across the flow line for closing thereof. In these instances, fluid is frequently trapped between the closure member and the bottom or inner periphery of the flow line, thus precluding a complete seating or closing of the gate member, which results in an inefficient closing of the flow line.

SUMMARY OF THE INVENTION

The present invention contemplates a novel safety valve or heat actuated valve particularly designed and constructed for overcoming the foregoing disadvantages. The novel valve comprises a valve body adapted to be interposed in a flow line and having a central passageway for transmitting the flow stream through the valve. A valve seating portion is substantially centrally disposed in the valve body and a housing is suitably secured to the outer periphery of the valve body in open communication with the valve seating portion. A movable closure member comprising a gate member carried by a valve stem is disposed in the housing and is engagable with the valve seat in the closed position thereof for precluding flow of fluid through the valve. A heat sensitive or heat responsive element is disposed on the housing and receives the valve stem therethrough for maintaining the closure member in a normally full open position for precluding interference with the normal movement of the flow stream through the valve and flow line. A helical spring is disposed within the housing around the valve stem, and is suitably anchored between the housing and the gate member for constantly urging the gate member toward a closed position.

The heat sensitive element comprises an inner sleeve constructed from a suitable eutectic material, and having a central bore for receiving the valve stem therethrough. A stop member, such as a nut, or the like, is provided on the outer end of the valve stem for engagement with the outer surface of the eutectic sleeve for maintaining the gate member in the normal open position above the fluid passageway of the valve body. An outer sleeve surrounds the outer periphery of the eutectic sleeve and is constructed of a suitable material having a higher melting point than that of the eutectic material. Thus, not only is the eutectic sleeve partially protected from relatively low temperatures, but also, in the event the eutectic material begins to balloon or cold flow at the lower temperatures, the outer sleeve will efficiently retain the normal cylindrical configuration for the eutectic sleeve until such time that the ambient temperature surrounding the valve becomes excessive, such as when a fire occurs. Aperture means is provided in the outer sleeve for assuming the transmitting of the heat to the inner sleeve, and also for permitting the melting or fluid eutectic material to flow out of the outer sleeve. As the inner sleeve melts and flows, the stop member on the outer end of the valve stem is no longer supported against the force of the spring, and the spring quickly moves the gate member into sealing position against the valve seat for interrupting the flow of fluid through the valve.

A bleed port is provided in the valve body in the proximity of the valve seat in order to discharge any fluid which may be trapped beneath the gate member during closing thereof, thus assuring that the gate member may be efficiently seated against the valve seat for a complete closing of the valve.

DESCRIPTION OF THE PREFERRED EMBODIMENT

Figure 1:
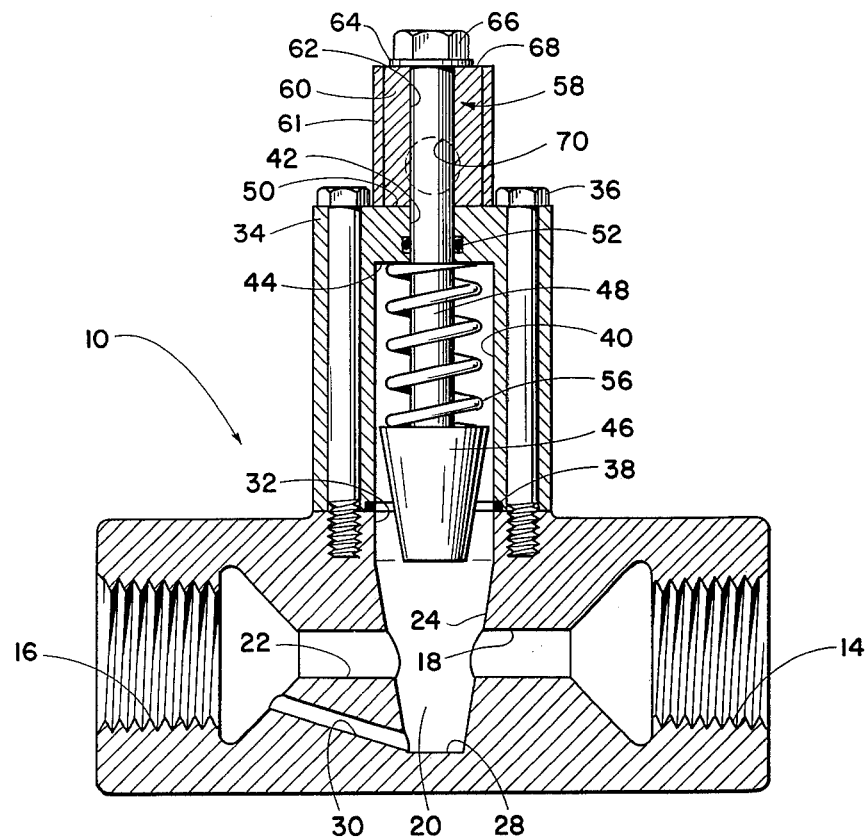
FIG. 1 is a sectional elevational view of a heat actuated valve embodying the invention.
Figure 2:
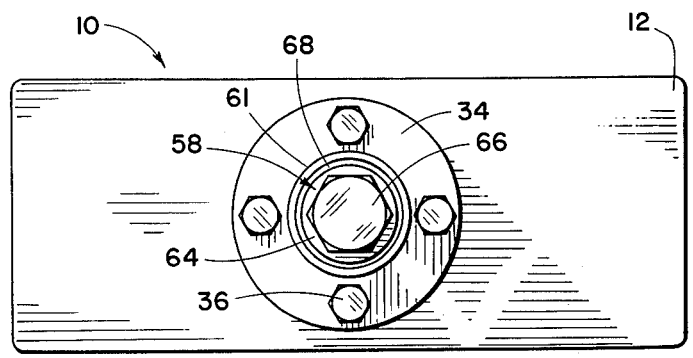
FIG. 2 is a plan view of a heat actuated valve embodying the invention.

Referring to the drawings in detail, reference character 10 generally indicates a heat actuated valve comprising a substantially cylindrical valve body 12 having oppositely disposed aligned inlet and outlet ports 14 and 16 for interposing the body 12 in a flow line (not shown). The flow through the body 12 may be in either direction, and for purposes of illustration only, the port 14 will be considered as the inlet port and the port 16 will be considered as the outlet port.

The inlet port 14 may be reduced at 18 and extends into open communication with a central recess 20. The outlet port 16 may be reduced at 22 similar to the reduced portion 18 and is also in open communication with the central recess 20. The recess 20 may be of substantially any desired configuration, and as shown herein is of a substantially conical configuration, providing a substantially conical valve seat 24 within the body 12. Alternatively, the recess 20 may be disposed transverse with respect to the bores 18 and 22, and provided with either flat opposing sides (not shown), or tapered opposing sides (not shown) to form a valve seat within the body 12. In any event, it is preferable that the bottom 28 of the recess 20 as viewed in FIG. 1, be flat, but not limited thereto, and a bleed port or bleed passageway 30 extends between the lower portion of the recess 20 and the outlet port 16 for a purpose as will be hereinafter set forth.

A bore or passageway 32 extends between the recess 20 and the exterior of the valve body 12 to provide access to the recess 20. A housing 34, which is preferably of a substantially cylindrical configuration, but not limited thereto, is disposed on the outer periphery of the body 12 for covering the opening 32, and may be secured to the body 12 in any suitable manner, such as by a plurality of spaced bolts 36, or the like. Suitable sealing means, such as an O-ring 38, may be interposed between the outer periphery of the body 12 and the housing 34 for precluding leakage of fluid therebetween. The housing 34 is provided with a central bore 40 extending longitudinally therein and disposed in substantial alignment with the recess 20 and bore 32, as particularly shown in FIG. 1. The bore 40 is reduced at 42 to provide an annular shoulder 44 spaced from the outer periphery of the body 12.

A gate member 46 carried by a valve stem 48 is movably disposed within the bore 40 of the housing 34. The gate member 46 may be of any suitable configuration compatible with the configuration of the recess 20, as desired. For example, in the event the recess 20 is of a substantially conical configuration, as depicted herein, the gate member 46 may be of a complementary conical configuration for seating against the conical valve seat 24 in the closed position of the valve 10 for precluding flow of fluid through the valve. Alternately, in the event the recess 20 is of another configuration, the gate member 46 may be of a slab-type or other complementary configuration as is well known in order to seat against the valve seat for closing the valve when desired.

The valve stem 48 extends slidably through the bore 42 and projects beyond the outer end 50 of the housing 34, as clearly shown in FIG. 1. Suitable sealing means, such as an O-ring 52 may be interposed between the stem 48 and the bore 42 for precluding leakage of fluid therebetween. A suitable helical spring 56 is suitably anchored between the shoulder 44 and the gate member 46 for constantly urging the gate member 46 in a direction toward the valve seat 24, for a purpose as will be hereinafter set forth.

A thermosensitive or heat responsive element generally indicated at 58 is disposed adjacent the upper end 50 of the housing 34, and is preferably disposed within the area defined by the bolts 36. The heat sensitive or heat responsive element 58 comprises an inner sleeve 60 constructed from a suitable eutectic material having a relatively low melting point and an outer sleeve 61 provided therearound which is constructed from a material having a higher melting point, such as aluminum.

The inner sleeve 60 is provided with a central bore 62 extending longitudinally therethrough for receiving the valve stem 48 therein. A suitable washer 64 and nut 66, or the like, are provided on the outer extremity of the valve stem 48 for bearing against the outer surface 68 of the inner sleeve 60 in order to retain the valve stem 48 in a raised position whereby the stop member 54 is retained in engagement with the shoulder 44 for securely retaining the gate member 46 in a raised position against the force of the spring 46, thus retaining the gate member 46 in a normal position away from the valve seat 24 to provide a normal full open position for the valve 10.

Figure 3:
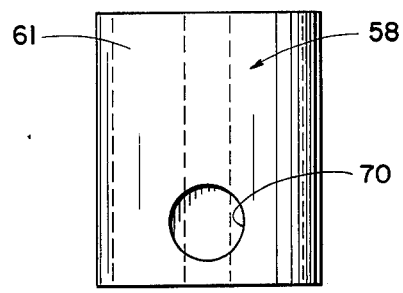
FIG. 3 is a side elevational view of a heat responsive element utilized in a heat actuated valve embodying the invention.

The outer sleeve 61 is provided with at least one aperture 70, preferably in the proximity of the lower end thereof, as particularly shown in FIG. 3, which provides a relief port for discharge of the eutectic material of the inner sleeve 60 upon melting thereof when the surrounding temperature reaches a sufficiently high degree, such as when a fire occurs, or the like.

In use, the valve 10 may be interposed in a flow line (not shown), in any suitable manner whereby the inlet and outlet ports 14 and 16 are in communication with the interior of the flow line for transmitting flow of fluid through the valve. The gate member 46 is retained in the normal raised position thereof as shown in FIG. 1 for precluding interference of the flow stream moving through the valve.

When the ambient temperature surrounding the valve 10 becomes excessive, such as when a fire occurs, or the like, the inner sleeve 60 begins to melt, and runs out or discharges through the aperture 70 in the outer sleeve 61. As the eutectic material flows, the overall height of the sleeve 60 diminishes and the sleeve 60 substantially dissolves and flows from the interior of the outer sleeve 61. When this occurs, the force of the spring 56 quickly moves the gate or closure member 46 downwardly into a seating position against the valve seat 24, thus closing the valve 10 and precluding any further flow of fluid through the flow line.

As the gate member 46 moves downwardly toward a sealing position against the valve seat 24, any fluid which may be trapped between the closure member and the bottom 28 of the recess 20 will be forced outwardly through the bleed passageway 30 for discharge through the port 16, thus assuring an efficient seating of the closure member 46 in the valve seat 24 for an efficient closing of the valve 10.

The outer sleeve 61, being constructed of a material which has a higher melting point than that of the inner sleeve 60, securely retains the inner sleeve 60 in its normal cylindrical configuration in the event the eutectic material tends to balloon at temperatures lower than those requiring an actual closing of the valve 10. Thus, the closure member 46 is efficiently retained in a full open position at all times until sufficiently high ambient temperature conditions occur which require the quick and efficient closing of the valve.

From the foregoing it will be apparent that the present invention provides a novel safety valve of the heat responsive type wherein a heat sensitive or heat responsive element is provided for retaining a closure member in a normal full open position and responding to high ambient temperatures for efficiently closing the valve to interrupt the flow of fluid through a flow line. The heat responsive element comprises an inner sleeve constructed from a suitable eutectic material which melts at a preselected high temperature, said inner sleeve being contained within an outer sleeve constructed from a material having a higher melting point for precluding "cold flow" of the eutectic material whereby the normal configuration of the eutectic sleeve is maintained until the ambient temperature reaches a sufficient high temperature that it is desirable to close the valve. In addition bleed port means is provided in the valve body for discharge of any fluid trapped beneath the closure member during closing thereof. The novel safety valve is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed:

1. A heat actuated valve comprising a valve body having a fluid passageway extending therethrough, valve seat means provided in the body in communication with the fluid passageway means, valve closure means mounted in the valve body and movable transversely with respect to the fluid passageway, spring means engagable with the closure means for constantly urging the closure member in a direction toward the valve seat, heat responsive means secured to the valve closure means for retaining the closure means against the force of the spring to provide a normally open position for the valve, said heat responsive means being constructed from a eutectic material responsive to preselected excessive ambient temperatures for flowing and releasing the closure means whereby the spring means moves the closure means into seating engagement with the valve seat means to provide a closed position for the valve, retaining means cooperating with the heat responsive means for precluding cold flowing thereof at temperatures lower than the preselected temperature to preclude premature closing or partial closing of the valve; and wherein the closure means comprises a valve stem having a gate member carried thereby, and the heat responsive means comprises a sleeve member of eutectic material receiving the valve stem therethrough, and including stop means secured to the outer extremity of the valve stem for engaging the eutectic sleeve to retain the closure member against the force of the spring to provide said normal open position for the valve; and wherein the retaining means comprises a sleeve constructed of a material having a higher melting point than the eutectic sleeve and disposed around the outer periphery thereof for precluding said cold flowing of the eutectic sleeve to maintain the eutectic sleeve in the normal configuration thereof at temperatures lower than the preselected temperatures for precluding premature closing or partial closing of the valve; and wherein the retaining sleeve includes aperture means providing for flow of the eutectic material from the interior of the retaining sleeve upon excessive ambient temperatures; and wherein said eutectic sleeve and said retaining sleeve comprise a unitary assembly separate from said valve, and in abutting contact therewith the interior surface of said retaining sleeve being in intimate contact with the outer surface of said eutectic sleeve to prevent cold flow of the material of said eutectic sleeve.

2. A heat actuated valve as set forth in claim 1 and including transversely extending passageway means provided in the valve body between the valve seat and the exterior of the body for receiving the closure member therein, housing means secured to the valve body surrounding the transverse passageway means and having a central bore in alignment therewith for receiving the closure means therein, annular shoulder means provided in the housing means and spaced from the valve body, said spring means being anchored between the annular shoulder means and the closure means for constantly urging the closure means in a direction toward the valve seat.

3. A heat actuated valve as set forth in claim 2 wherein said gate member carried by the valve stem has a configuration complementary to the configuration of the valve seat means, and said heat responsive means being disposed on the outer surface of said housing.

4. A heat actuated valve as set forth in claim 3 and including bleed port means provided communication between the fluid passageway and the lower portion of the transversely extending passageway for discharging fluid trapped between the gate member and the valve body in the closed position of the valve.

5. A heat actuated valve as set forth in claim 1 and including bleed port means in communication with the fluid passageway for discharging fluid trapped between the closure member and the valve body in the closed position of the valve.

* * * * *